(12) United States Patent
Yang et al.

(10) Patent No.: US 10,050,580 B2
(45) Date of Patent: Aug. 14, 2018

(54) SUPPORTING STRUCTURE FOR WATERBORNE PHOTOVOLTAIC POWER GENERATION

(71) Applicants: BOE Technology Group Co., Ltd., Beijing (CN); Beijing BOE Energy Technology Co., Ltd., Beijing (CN)

(72) Inventors: Peihuan Yang, Beijing (CN); Hangbin Song, Beijing (CN); Xiaoyan Han, Beijing (CN)

(73) Assignees: BOE Technology Group Co., Ltd., Beijing (CN); Beijing BOE Energy Technology Co., Ltd., Beijing (CN)

( * ) Notice: Subject to any disclaimer, the term of this patent is extended or adjusted under 35 U.S.C. 154(b) by 0 days.

(21) Appl. No.: 15/228,120

(22) Filed: Aug. 4, 2016

(65) Prior Publication Data

US 2017/0201206 A1    Jul. 13, 2017

(30) Foreign Application Priority Data

Jan. 12, 2016   (CN) .......................... 2016 1 0019280

(51) Int. Cl.
*H01L 31/042* (2014.01)
*H02S 20/30* (2014.01)
*H02S 10/40* (2014.01)
*B63B 35/44* (2006.01)
*F24J 2/52* (2006.01)

(52) U.S. Cl.
CPC .............. *H02S 20/30* (2014.12); *H02S 10/40* (2014.12); *B63B 2035/4453* (2013.01); *F24J 2/5269* (2013.01); *Y02E 10/47* (2013.01)

(58) Field of Classification Search
CPC ........ F24J 2/5233; F24J 2/5235; F24J 2/5237; F24J 2/5239; B63B 2035/4453
See application file for complete search history.

(56) References Cited

U.S. PATENT DOCUMENTS

| | | | |
|---|---|---|---|
| 2007/0193494 A1* | 8/2007 | Bree | B63B 3/06 114/355 |
| 2013/0146127 A1* | 6/2013 | Lunoe | B63B 35/44 136/251 |
| 2015/0162866 A1 | 6/2015 | Yun et al. | |

FOREIGN PATENT DOCUMENTS

| | | |
|---|---|---|
| CN | 104183659 A | 12/2014 |
| CN | 204695116 U | 10/2015 |
| CN | 204696985 U | 10/2015 |

(Continued)

OTHER PUBLICATIONS

Apr. 1, 2017—(CN) First Office Action Appn 201610019280.X with English Tran.

(Continued)

*Primary Examiner* — Andrew Polay
(74) *Attorney, Agent, or Firm* — Banner & Witcoff, Ltd.

(57) ABSTRACT

A supporting structure for waterborne photovoltaic power generation is provided. The supporting structure includes at least one floating bracket. The floating bracket includes a floating platform and a plurality of supporting members provided on an upper surface of the floating platform, a ventilation space is provided between at least two adjacent supporting members, whereby the plurality of supporting members is configured to fix a photovoltaic cell panel thereon with a lower surface of the photovoltaic cell panel being separated from the upper surface of the floating platform.

13 Claims, 8 Drawing Sheets

(56) References Cited

FOREIGN PATENT DOCUMENTS

| | | | |
|---|---|---|---|
| CN | 105162399 | * | 12/2015 |
| CN | 105162399 A | | 12/2015 |
| CN | 205283473 U | | 6/2016 |
| KR | 20150109870 A | | 10/2015 |

OTHER PUBLICATIONS

Aug. 29, 2017—(CN) Second Office Action Appn 201610019280.X with English Tran.

* cited by examiner

SUPPORTING STRUCTURE FOR WATERBORNE PHOTOVOLTAIC POWER GENERATION

This application claims priority to and the benefit of Chinese Patent Application No. 201610019280.X filed on Jan. 12, 2016, which application is incorporated herein in its entirety.

TECHNICAL FIELD

An embodiment of the present disclosure relates to a supporting structure for waterborne photovoltaic power generation.

BACKGROUND

Solar energy is a kind of renewable energy source inexhaustible for human beings, and a kind of power generation form by which the solar energy is directly converted into electric energy by photovoltaic cells is referred to as photovoltaic power generation. In distributed photovoltaic power generation methods, waterborne photovoltaic power generation gradually becomes an important photovoltaic power generation form due to its advantages such as saving land resource, increasing profits of fishing industry, and having high power generation efficiency.

SUMMARY

An embodiment of the present disclosure provides a supporting structure for waterborne photovoltaic power generation. The supporting structure includes at least one floating bracket. The floating bracket includes a floating platform and a plurality of supporting members provided on an upper surface of the floating platform, a ventilation space is provided between at least two adjacent supporting members, whereby the plurality of supporting members is configured to fix a photovoltaic cell panel thereon with a lower surface of the photovoltaic cell panel being separated from the upper surface of the floating platform.

DESCRIPTION OF THE ACCOMPANYING DRAWINGS

In order to more clearly describe the technical solution of the embodiments of the present disclosure, the accompanying drawings for the embodiments will be briefly described, it is obvious that the accompanying drawings in the following description only illustrate some embodiments of the present disclosure, but not are intended to limit the present disclosure. To the person skilled in the art, other relevant accompanying drawings can also be conceived according to these drawings without any creative labor.

DESCRIPTION OF REFERENCE NUMERALS

1—floating bracket; 11—floating platform; 111—first side face; 12—supporting member; 12a—first supporting member; 12b—second supporting member; 121—supporting surface; 122—fixing member; 13—ventilation space; 14—barrier; 15—storage groove; 16—enforcement rib; 17—drainage hole; 18—connection part; 181—recess; 182—protrusion; 183—first position pin; 184—fixing hole; 185—connection hole; 186—connection rod; 19—drainage groove; 133—adhered face.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
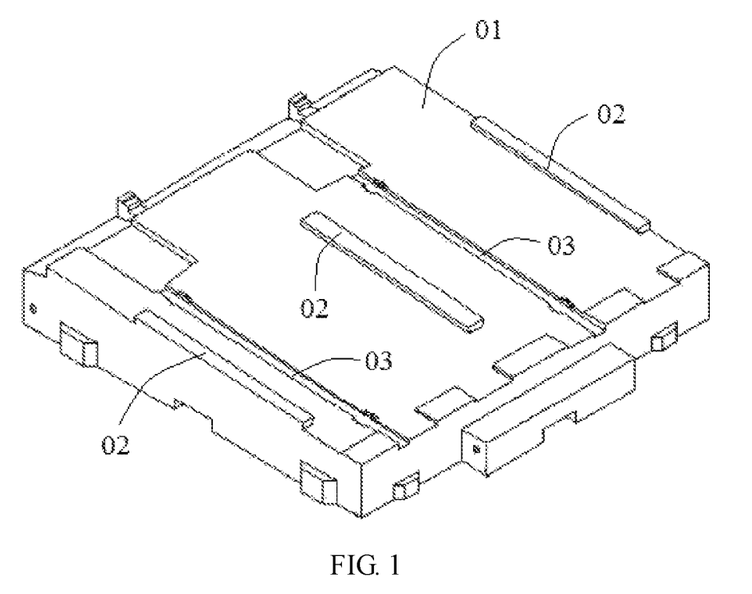
FIG. 1 is a schematic view illustrating a supporting structure for waterborne photovoltaic power generation.

FIG. 1 shows a supporting structure for waterborne photovoltaic power generation. The supporting structure includes a floating platform 01, and a photovoltaic cell panel (not illustrated in Figures) is supported on an upper surface of the floating platform 01. The upper surface of the floating platform 01 is provided with at least one insert groove 02 for fixing the photovoltaic cell panel on the floating platform 01, and the upper surface of the floating platform 01 is also provided with at least one through groove 03 for ventilation and heat dissipation. Although the through groove 03 for ventilation and heat dissipation is provided on the supporting structure, when the photovoltaic cell panel is fixed on the floating platform 01, most of the large area of the lower surface of the photovoltaic cell panel is also adhered with the upper surface of the floating platform 01, so that the heat generated from the photovoltaic cell panel can not be dissipated outside in time, and power generation efficiency of the photovoltaic cell panel is caused to be degraded.

As illustrated in FIG. 2A to FIG. 5, according to an embodiment of the present disclosure, a supporting structure for waterborne photovoltaic power generation is provided. The supporting structure includes a floating bracket 1, the floating bracket 1 includes a floating platform 11 and a plurality of supporting member 12 provided on an upper surface of the floating platform 1, a ventilation space 13 is provided between two adjacent supporting members 12, and a photovoltaic cell panel (see FIG. 8) can be fixed on the plurality of supporting members 12 in such a manner that when the photovoltaic cell panel is fixed on the floating bracket 1, a lower surface of the photovoltaic cell panel is separated from the upper surface of the floating platform 11 with a predetermined gap therebetween.

Figure 4:
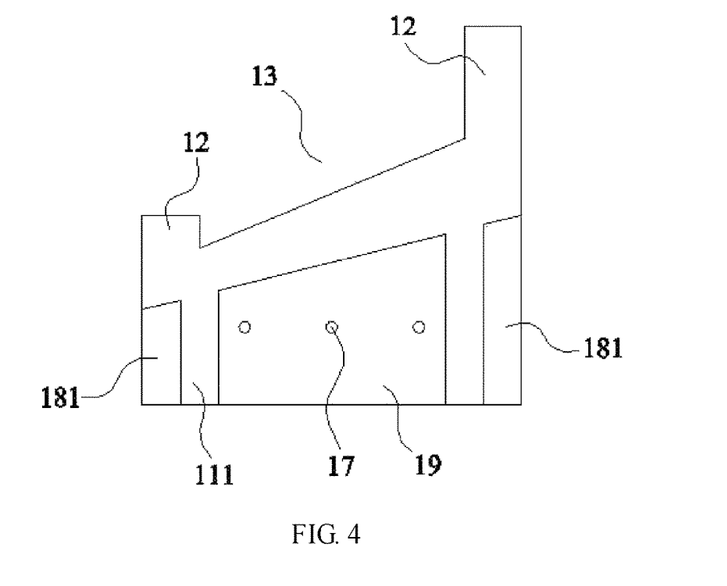
FIG. 4 is a left view illustrating the supporting structure for waterborne photovoltaic power generation as illustrated in FIG. 2A.
Figure 5:
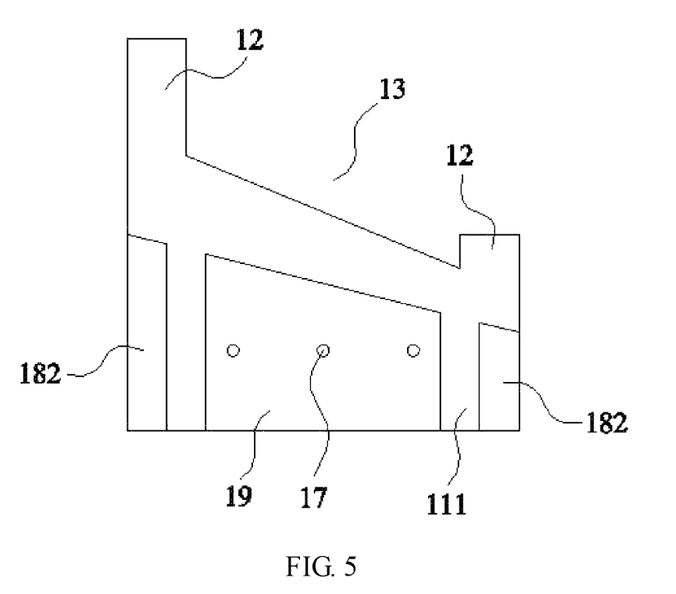
FIG. 5 is a right view illustrating the supporting structure for waterborne photovoltaic power generation as illustrated in FIG. 2A.
Figure 8:
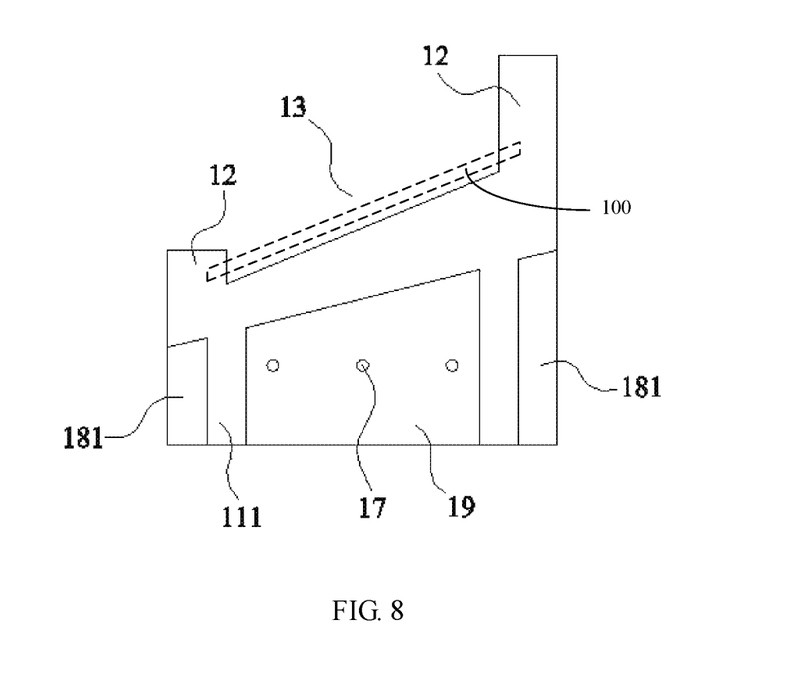
FIG. 8 is a schematic view illustrating the supporting structure based on FIG. 4, on which photovoltaic cell panels are mounted.

FIG. 8 is a schematic view of the supporting structure in FIG. 4 on which the photovoltaic cell panel is mounted. As illustrated in FIG. 8, the photovoltaic cell panel 100 is obliquely provided on the supporting structure for waterborne photovoltaic power generation so that the lower surface of the photovoltaic cell panel 100 is separated from the upper surface of the floating platform 11 with the predetermined gap therebetween.

In the supporting structure for waterborne photovoltaic power generation provided by the embodiment of the present disclosure, the plurality of supporting members 12 is provided on the upper surface of the floating platform 11, and the photovoltaic cell panel can be fixed on the plurality of supporting members 12. Because a ventilation space 13 is left between two adjacent supporting members 12 and the lower surface of the photovoltaic cell panel is separated from the upper surface of the floating platform 11, air can flow through the ventilation space 13 between the two adjacent supporting members 12 and pass through the lower surface of the photovoltaic cell panel, and thus heat generated by the photovoltaic cell panel can be brought out in time, that is, the heat generated by the photovoltaic cell panel can be dissipated outside in time, and the problem of degradation of the power generation efficiency of the photovoltaic cell panel because a raised temperature can be avoided in operation.

According to the embodiment of the present disclosure, the supporting structure for waterborne photovoltaic power generation can be floated on a water surface of a lake for example, and therefore, the operation for forming posts under water for fixing the waterborne supporting structure can be omitted, the workload for construction can be largely reduced, cost can be decreased, the supporting structure will not be influenced by the variation of the water level, and the reliability can be improved.

In order to lengthen service life of the photovoltaic cell panel, referring to FIG. 2A to FIG. 6, in the present embodiment, each of the supporting member 12 includes a supporting surface 121 for supporting the photovoltaic cell panel, the supporting surface 121 of each of the supporting members 12 is provided with a fixing member 122, and the fixing members 122 of the supporting member 12 can fix the photovoltaic cell panel on the supporting surfaces 121 of the supporting members 12. By using the plurality of supporting surfaces 121 to support the photovoltaic cell panel, contact area between the photovoltaic cell panel and the supporting members 12 can be increased, thus pressure acted on each of the supporting members can be reduced, the photovoltaic cell panel cannot be easily damaged, and hence the service life of the photovoltaic cell panel can be lengthened.

Figure 2A:
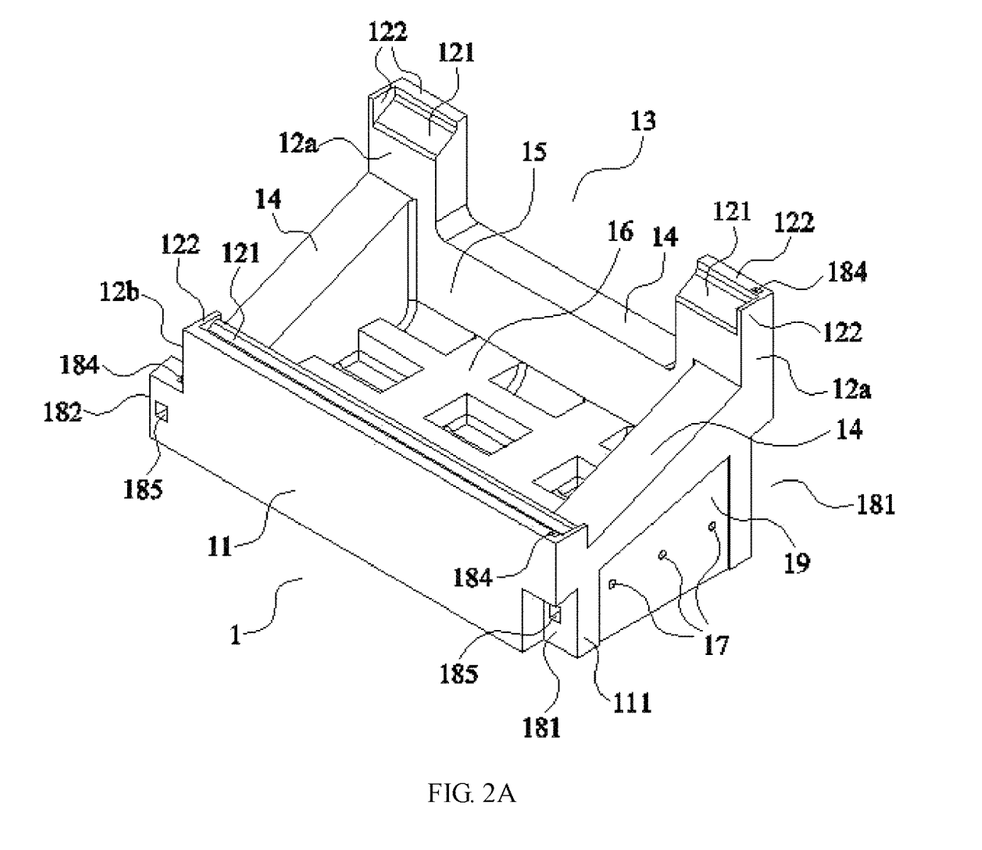
FIG. 2A-2B are perspective view illustrating a supporting structures for waterborne photovoltaic power generation according to embodiment of the present disclosure.

In order to increase the power generation capacity of the photovoltaic cell panel, referring to FIG. 2A, in the present embodiment, the supporting surfaces 121 of the plurality of the supporting members 12 are located in a same one oblique plane, therefore, after the photovoltaic cell panel is fixed on the supporting surfaces 121 of the plurality of supporting members 12, the photovoltaic cell panel is obliquely provided so that light from the sun can be irradiated on the photovoltaic cell panel in a perpendicular direction or in approximate perpendicular direction as much as possible, thus the generation capacity of the photovoltaic cell panel can be increased.

For example, in the present embodiment, there are provided three supporting members 12, including two first supporting members 12a having the same height and a second supporting member 12b, the height of the two first supporting members 12a is larger than the height of the second supporting member, and the second supporting member 12b has a width larger than that of the two first supporting members. The two first supporting members 12a are used to support a same side edge of the lower surface of the photovoltaic cell panel, and the second supporting member 12b is used to support the other side edge of the lower surface of the photovoltaic cell panel, so that the photovoltaic cell panel is obliquely supported.

Figure 2B:
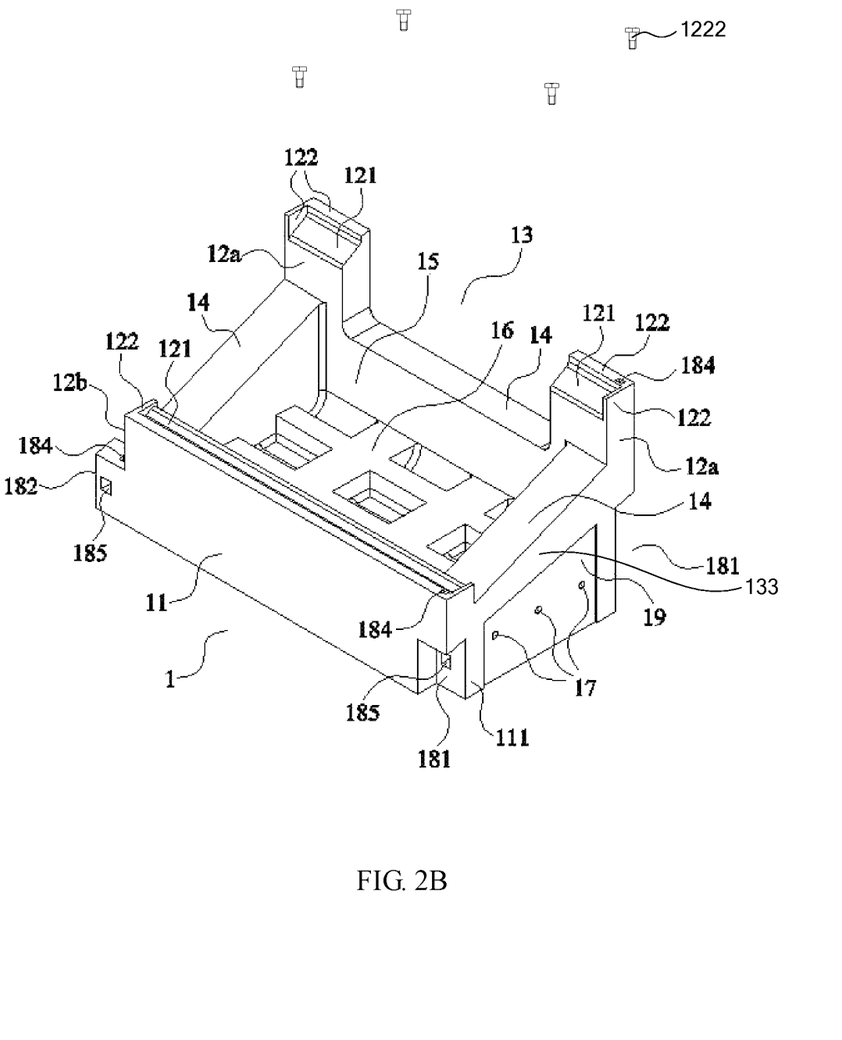
Figure 3:
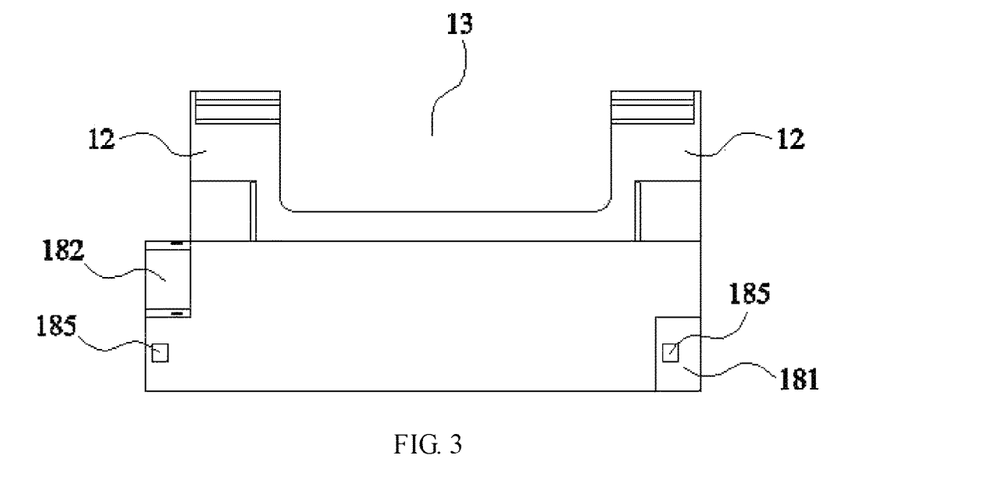
FIG. 3 is a front view illustrating the supporting structure for waterborne photovoltaic power generation as illustrated in FIG. 2A.

For example, as illustrated in FIG. 2B, the above described fixing member 122 may include adhesive for example in a form of tape, and by adhesive, the photovoltaic cell panel is adhered to the supporting surfaces 121. Alternatively, as illustrated in FIG. 2B, the fixing member 122 may include screws 1222; in this case holes are provided at corresponding positions on the photovoltaic cell panel and the supporting surfaces 121, the holes on the photovoltaic cell panel can be unthreaded holes, and the holes on the supporting surfaces 121 can be threaded holes, the screws are screwed in the threaded holes of the supporting surfaces 121 after passing through the unthreaded holes of the photovoltaic cell panel, to fix the photovoltaic cell panel onto the supporting surfaces 121.

For example, the fixing member 122 may also include a baffle and a snap. After the photovoltaic cell panel is placed on the supporting surfaces 121 of the plurality of supporting members 12, each side of the photovoltaic cell panel is abutted against a baffle, so that the photovoltaic cell panel is prevented from moving in a plane parallel to its upper surface. A plurality of snaps can all be engaged with the upper surface of the photovoltaic cell panel, thus the photovoltaic cell panel is prevented from moving in a direction perpendicular to the upper surface of the photovoltaic cell panel, and therefore the photovoltaic cell panel is fixed onto the supporting surfaces 121.

Compared with adhesive, fixing the photovoltaic cell panel by baffles and snaps enables the photovoltaic cell panel to be easily detached later, and compared with screws, using the baffles and snaps to fix the photovoltaic cell panel can avoid the holes drilled on the photovoltaic cell panel, thus damage to the photovoltaic cell panel can be avoided, and the structure of the photovoltaic become more stable.

Furthermore, in the present embodiment, a plurality of barriers 14 are provided on the upper surface of the floating platform 11, the plurality of barriers 14 surrounds to form a storage groove 15 in which electricity distribution equipment such as combiner box, inverter, or the like can be mounted, and therefore, the electricity distribution equipment can be mounted nearby, it is unnecessary to additionally built power station, and thus cost and length of cables can be largely saved. In addition, when the photovoltaic cell panel is amounted in areas with strong wind, especially, when the photovoltaic cell panel is inclined at a large angle, ballast, such as cement blocks, can be placed in the storage groove 15, to improve the stability of the supporting structure.

Figure 6:
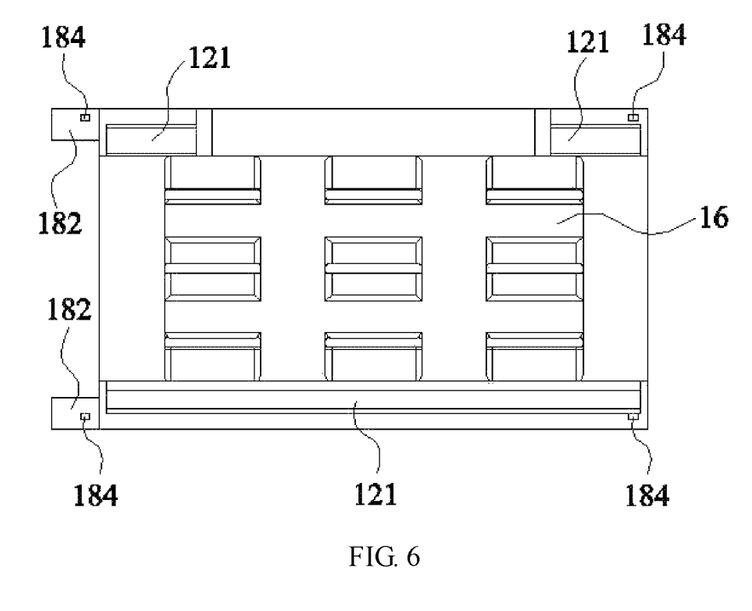
FIG. 6 is a top view illustrating the supporting structure for waterborne photovoltaic power generation as illustrated in FIG. 2A.

In order to lengthen the service life of the supporting structure for waterborne photovoltaic power generation, referring to FIG. 2A and FIG. 6, in the present embodiment, enforcement ribs 16 are provided on upper surface of a bottom wall of the storage groove 15, the enforcement ribs 16 are connected with inner surfaces of side walls of the storage groove 15, and therefore, structural strength of the bottom wall and the side walls of the storage groove 15 can be simultaneously improved, thus the entire strength of the supporting structure for waterborne photovoltaic power generation can be improved, and hence the service life of the supporting structure for waterborne photovoltaic power generation can be lengthened.

During the supporting structure for waterborne photovoltaic power generation is practically used, due to variation of the water level, it is possible that water is sputtered into the storage groove 15 through the ventilation space 13 between the two adjacent supporting members 12, and the water will affect the normal operation of the distribution equipment in the storage groove 15 overtime. In order to discharge the water sputtered into the storage groove 15 in time, referring to FIG. 2A, FIG. 4 and FIG. 5, in the present embodiment, at least one drainage hole 17 can be provided on the side wall of the storage groove 15, thus the water in the storage groove 15 can flow out through the drainage hole 17 in time, that is, the water in the storage groove 15 can be discharged in time, and the influence by the water on the normal operation of the distribution equipment in the storage groove 15 can be avoided.

If the distance between the drainage holes 17 and the lower surface of the floating platform 11 is too small, it is possible that water flows into the storage groove 15 through the drainage hole 17, causing the supporting structure for waterborne photovoltaic power generation is adversely affected and even sunk down overtime. In order to avoid this problem, in the present embodiment, the distance between the drainage hole 17 and the lower surface of the floating platform 11 is larger than or equal with 10 cm, and therefore, the drainage hole 17 can be located above the water level, thus water is prevented from flowing into the storage groove 15 through the drainage hole 17, and hence the problem of the supporting structure for waterborne photovoltaic power generation being adversely affected even sunk down can be avoided.

Figure 7A:
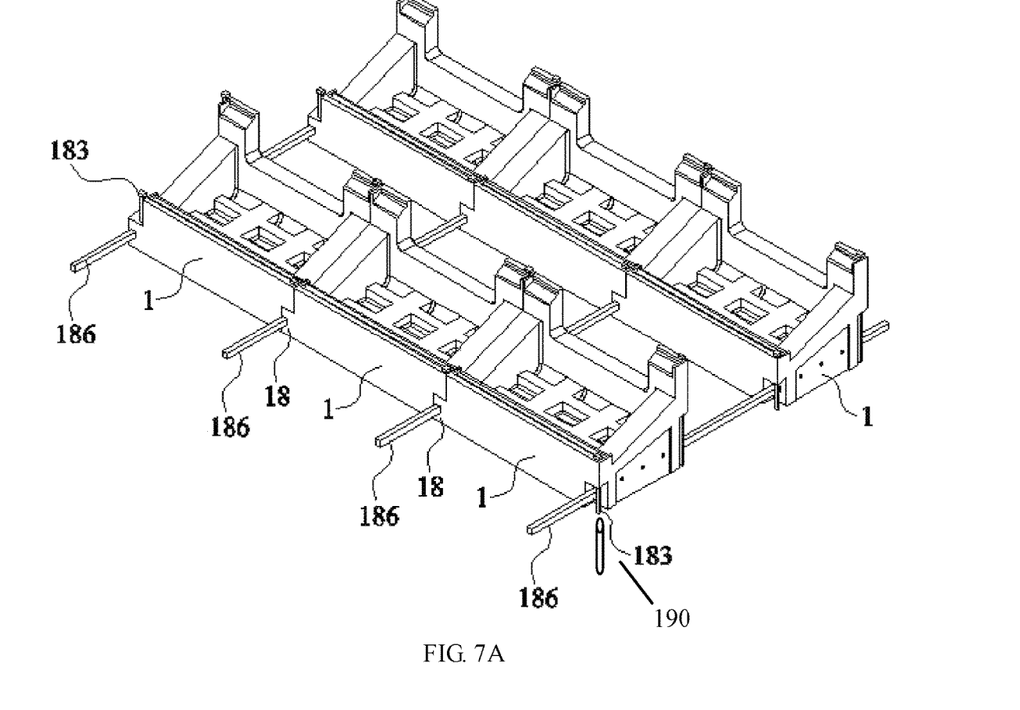
FIG. 7A is a schematic view illustrating a state in which a plurality of floating brackets are connected integrally.

In order to increase power generation capacity and stability of the supporting structure for waterborne photovoltaic power generation when in operation, referring to FIG. 7A, in the present embodiment, a plurality of floating brackets 1 can be used altogether, each of the floating bracket 1 may include a connection part 18, by which the plurality of floating brackets 1 can be connected integrally. Thus, a photovoltaic cell panel can be provided on each of the floating brackets 1, an array of photovoltaic cell panels can be obtained, and the power generation capacity can be increased accordingly. By connecting the plurality of floating brackets 1 into one unit, it is also possible to improve the stability of the supporting structure for waterborne photovoltaic power generation in operation.

Furthermore, referring FIG. 2A to FIG. 6, the floating platform 11 includes two first side faces 111 parallel with each other and both perpendicular to the oblique plane, the connection part 18 includes a recess 181, a protrusion 182, and a first position pin 183, and the recess 181 and the protrusion 182 are respectively located on the two first side faces 111. There are provided for example two protrusions 182 and two recesses 181. The two protrusions 182 and the two recesses 181 are both provided at two edges of the first side faces 111 along a horizontal direction. When the plurality of floating brackets 1 are connected along a direction perpendicular to the first side face 111, the protrusions 182 on any one of the floating brackets 1 can be fittingly provided in the recesses 181 on another adjacent floating bracket 1, and are fixed by first position pins 183, thus the plurality of floating brackets 1 can be connected into a stable unit along the direction perpendicular to the first side face 111. The first position pin 183 is preferably made of metal, so as to guarantee the reliability of the connection among the plurality of floating brackets 1.

For example, fixing holes 184 are provided on inner walls of the protrusions 182 and the recesses 181, and the fixing holes 184 for example are provided along a vertical direction. When the protrusions 182 of one floating platform is fittingly engaged in the recesses 181 of another adjacent floating platform, the two fixing holes 184 on the inner walls of the pair of protrusion 181 and recess 181 are aligned, and a first position pin 183 is inserted into the aligned fixing holes 184 on the pair of protrusion 182 and recess 181 simultaneously, so as to fix the protrusion 182 and the recess 181.

Figure 7B:
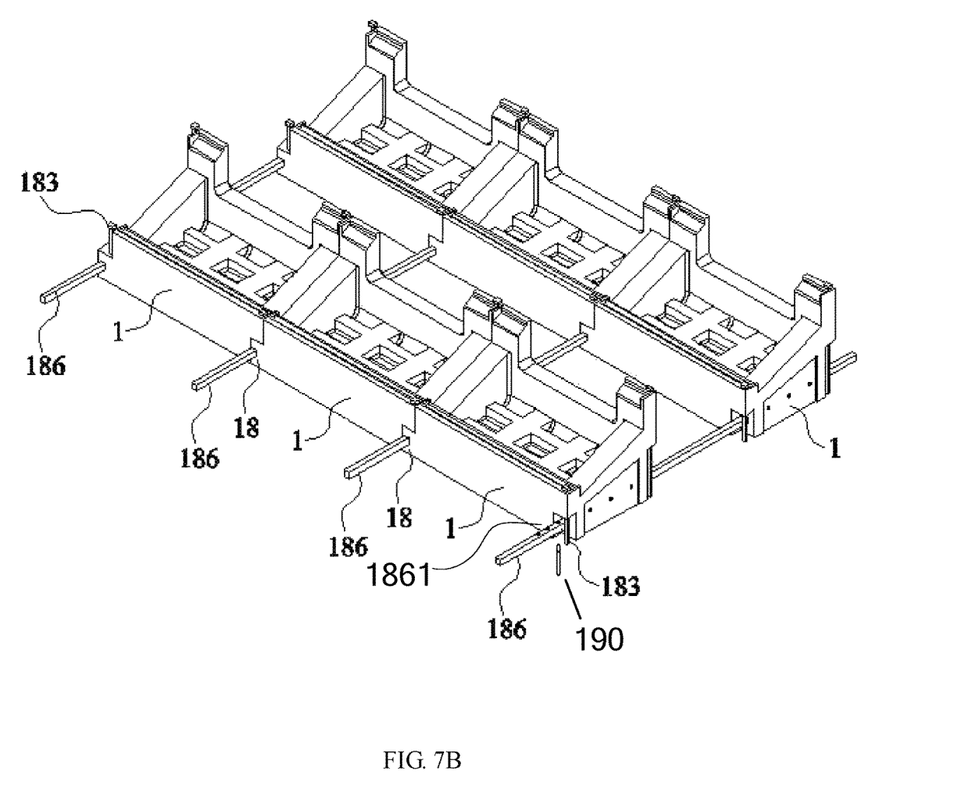
FIG. 7B is a schematic view illustrating a state in which a plurality of floating brackets are connected integrally as provided by an embodiment of the disclosure.

Furthermore, the connection part 18 further includes a connection hole 185, a connection bar 186 and a second position pin 190 (see FIG. 7A). The connection hole 185 is parallel with the first side face 111, for example the connection bar 186 is further provided with a plurality of position holes 1861 (as illustrated in FIG. 7B) along its lengthwise direction, and the second position pin can be inserted into any one of the position holes. When the plurality of floating brackets 1 are connected along a direction parallel with the first side face 111, the connection bar 186 can be sequentially inserted through the connection holes 185 in two adjacent floating brackets 1, or inserted through the connection holes 185 in more than two floating brackets 1, and the second position pins 190 are respectively provided in the position holes adjacent to both ends of the connection bar 186 so that the second position pins 190 are abutted against the floating brackets. When the connection bar 186 is mounted in the connection holes 185, the position pins 190 are used to fix the connection bar 186, but in embodiments of the present disclosure, the connection bar 186 can be fixed in various ways. Thus, a plurality of floating brackets 1 can be connected into a stable unit along the direction parallel with the first side wall 111, the connection bar 186 is for example a profiled material, and the second position pin is preferably made of a metal.

In addition, in the supporting structure for waterborne photovoltaic power generation according to the present embodiment, the distance between two adjacent floating brackets 1 along the extension direction of the connection bar 186 is adjustable, thus light irradiation to any one of the photovoltaic cell panels can be prevented from being blocked, and therefore, the power generation capacity of the photovoltaic cell panel can be increased.

With fixation by way of the protrusions 182 and the recesses 181, the plurality of supporting brackets 1 can be connected along the direction perpendicular to the first side face 111, and by way of the connection bar 186, the connection hole 185 and the second position pin 190, the plurality of supporting brackets 1 can be connected along the direction parallel with the first side face 111, and in this way the connection of the plurality of floating brackets 1 can be achieved conveniently and easily, construction work for an array of photovoltaic cell panels can be facilitated, and the supporting structure can more practical.

Referring to FIG. 2A and FIG. 7A, there can be a plurality of floating brackets 1, the plurality of floating brackets 1 can be connected into a unit, and two adjacent floating brackets 1 are adhered with their opposing side faces. In this case, in order to discharge water in the storage groove 15 more smoothly, each floating bracket 1 is provided with a drainage groove 19 concaved inwardly on its side face adjacent to another floating bracket, the drainage groove 19 has an end communicated with the drainage hole 17 and another end extending to the lower surface of the floating platform 11. A plurality of drainage holes 17 can correspond to one drainage groove 19, or each drainage hole 17 can correspond to one drainage groove 19. Thus, the water sputtered into the storage groove 15 can be discharged sequentially through the drainage hole 17 and the drainage groove 19, thus the drainage can become smoother.

The floating bracket 1 can be made from plastic, so that the floating bracket 1 can more easily float on water surface of a lake or even the sea in operation. Furthermore, the material for the floating bracket 1 is for example polyvinyl chloride, thus it can be formed by injection mold process, which makes the process more convenient. In addition, the polyvinyl chloride has a relative high strength, which enables the supporting structure for waterborne photovoltaic power generation to have a more reliable entire strength, and thus the operation reliability of the waterborne photovoltaic power station can be guaranteed for 25 years.

What has been described above is only the exemplary embodiment of the present disclosure, and is not used to limit the protection scope of the present disclosure, which is only defined by the appending claims.

The present application claims the priority of a Chinese Patent Application No. 201610019280.X, filed on Jan. 12, 2016, the disclosure of which is entirely incorporated herein by reference.

What is claimed is:

1. A supporting structure for waterborne photovoltaic power generation, comprising at least one floating bracket, wherein the floating bracket comprises a floating platform and a plurality of supporting members provided on an upper surface of the floating platform,
a ventilation space is provided between at least two adjacent supporting members, whereby the plurality of supporting members is configured to fix a photovoltaic cell panel thereon with a lower surface of the photovoltaic cell panel being separated from the upper surface of the floating platform, wherein the upper surface of the floating platform is provided with a plurality of barriers surrounding to form a storage groove, wherein the storage groove has a bottom wall provided with an upper surface and side walls provided with inner surfaces, an enforcement rib is provided on the upper surface of the bottom wall of the storage groove, and the enforcement rib is connected with the inner surfaces of the side walls of the storage groove.

2. The supporting structure according to claim 1, wherein the supporting members comprise supporting surfaces for supporting the photovoltaic cell panel, the supporting surfaces are provided with fixing members, and the fixing members are configured for fixing the photovoltaic cell panel on the supporting surfaces.

3. The supporting structure according to claim 2, wherein the supporting surfaces are located in a same one oblique plane.

4. The supporting structure according to claim 3, wherein the supporting structure comprises a plurality of the floating brackets, each of the floating brackets comprises a connection part, by which the floating brackets can be connected into one unit.

5. The supporting structure according to claim 4, wherein the floating platform comprises two first side faces parallel with each other and both perpendicular to the oblique plane,
the connection part comprises a recess, a protrusion and a first position pin, and the recess and the protrusion are respectively located at the two first side faces; and
the protrusion on one floating bracket is configured to be engaged in the recess on another floating bracket and be fixed by the first position pin.

6. The supporting structure according to claim 5, wherein the connection part further comprises a connection hole and a connection bar, the connection hole is parallel with the first side faces, and the connection bar is configured to be inserted into the connection hole.

7. The supporting structure according to claim 6, wherein the connection bar is configured to be inserted sequentially through connection holes in two adjacent floating brackets.

8. The supporting structure according to claim 6, wherein the connection bar is configured to be inserted sequentially through connection holes in a plurality of nonadjacent floating brackets.

9. The supporting structure according to claim 6, wherein the connection part further comprises a second position pin, the connection bar is provided with a plurality of position holes along its lengthwise direction, and the second position pin is configured to be inserted into any one of the position holes.

10. The supporting structure according to claim 1, wherein a side wall of the storage groove is provided with a drainage hole whereby water in the storage groove can flow out through the drainage hole.

11. The supporting structure according to claim 10, wherein a distance between the drainage hole and a lower surface of the floating platform is larger than or equal with 10 cm.

12. The supporting structure according to claim 1, wherein a material of the floating bracket is polyvinyl chloride.

13. A supporting structure for waterborne photovoltaic power generation, comprising at least one floating bracket, wherein the floating bracket comprises a floating platform and a plurality of supporting members provided on an upper surface of the floating platform,
a ventilation space is provided between at least two adjacent supporting members, whereby the plurality of supporting members is configured to fix a photovoltaic cell panel thereon with a lower surface of the photovoltaic cell panel being separated from the upper surface of the floating platform, wherein the upper surface of the floating platform is provided with a plurality of barriers surrounding to form a storage groove, wherein a side wall of the storage groove is provided with a drainage hole whereby water in the storage groove can flow out through the drainage hole, wherein a drainage groove is provided in an adhered face of the floating bracket, the drainage groove comprises an end communicated with the drainage hole, and another end extending to a lower surface of the floating platform.

\* \* \* \* \*